United States Patent [19]
Loisel

[11] Patent Number: 6,106,348
[45] Date of Patent: *Aug. 22, 2000

[54] INFLATABLE PERSONAL FLOTATION DEVICE

[76] Inventor: Jean Loisel, 11562 Poincare, Montreal, Québec, Canada, H3L 3L7

[*] Notice: This patent issued on a continued prosecution application filed under 37 CFR 1.53(d), and is subject to the twenty year patent term provisions of 35 U.S.C. 154(a)(2).

[21] Appl. No.: 09/192,300

[22] Filed: Nov. 17, 1998

Related U.S. Application Data

[63] Continuation-in-part of application No. 09/073,826, May 7, 1998, abandoned, and a continuation of application No. PCT/CA98/00852, Sep. 10, 1998.

[30] Foreign Application Priority Data

May 7, 1996 [GB] United Kingdom .................... 9709118

[51] Int. Cl.⁷ ........................................... B63C 9/08
[52] U.S. Cl. ................................. 441/108; 441/92
[58] Field of Search ...................... 441/88, 90–99, 441/106–119; 222/5; 137/223, 231

[56] References Cited

U.S. PATENT DOCUMENTS

| | | | |
|---|---|---|---|
| 2,495,254 | 1/1950 | Heigis . | |
| 3,142,850 | 8/1964 | De Boer | 441/41 |
| 3,181,184 | 5/1965 | Potts | 441/108 |
| 3,414,920 | 12/1968 | Beaton | 441/92 |
| 3,754,731 | 8/1973 | Mackal et al. | 441/41 |
| 3,808,981 | 5/1974 | Shaw . | |
| 4,015,622 | 4/1977 | Pagani . | |
| 4,413,645 | 11/1983 | Seabase et al. . | |
| 4,579,141 | 4/1986 | Arff | 441/41 |
| 4,925,418 | 5/1990 | Mariotto née Amiel . | |
| 4,991,617 | 2/1991 | Butler . | |
| 5,188,142 | 2/1993 | Lind et al. | 441/41 |
| 5,702,279 | 12/1997 | Brown | 441/108 |

FOREIGN PATENT DOCUMENTS

| | | |
|---|---|---|
| 0 050 416 | of 1982 | European Pat. Off. . |
| 2 292 169 | of 1976 | France . |
| 2 595 654 | of 1987 | France . |
| 1 550 176 | of 1969 | Germany . |
| 1179468 | of 1970 | United Kingdom . |
| 1 533 879 | of 1978 | United Kingdom . |

*Primary Examiner*—Ed Swinehart
*Attorney, Agent, or Firm*—Robert A. Wilkes

[57] ABSTRACT

A personal floatation device (PFD) comprising an inflatable bladder which is attached to the wearer by a waist belt and anchor straps joined to a second belt attached directly to the bladder. Both a gas cartridge device and a oral device are provided for inflating the bladder. The gas nozzle through which the gas enters the bladder from the gas cartridge includes a plurality of gas paths which permit gas flow substantially perpendicular to the gas inlet nozzle axis thus overcoming difficulties in inflating the PFD caused by the extremely cold gas vented from the cartridge freezing the bladder material of the PFD in the vicinity of the gas inlet nozzle. a similar gas inlet nozzle can also be used for the oral inflation device.

19 Claims, 8 Drawing Sheets

INFLATABLE PERSONAL FLOTATION DEVICE

This application is a continuation-in-part of U.S. Ser. No. 09/073,826 filed May 7, 1998, now abandoned, and a continuation of PCT/CA98/00852 filed Sep. 10, 1998.

FIELD OF THE INVENTION

This invention relates to a personal flotation device, of the type worn by, and capable of supporting, one person. It is more particularly concerned with an inflatable personal flotation device, or PFD, which can be worn in the uninflated condition and inflated for use when required.

BACKGROUND OF THE INVENTION

Inflatable safety belts of this general type are well known, and several varieties are commercially available. Devices of this general type are described by Potts, U.S. Pat. No. 3,181,184; Beaton, U.S. Pat. No. 3,414,920; and Brown, U.S. Pat. No. 5,702,279. The known inflatable PFD's while in the main effective in providing the required level of flotation, suffer from a number of disadvantages. Many of the known PFD's do not sit comfortably on the wearer when uninflated, which leads to the PFD not always being worn when it should be. Effectively all of the known inflatable PFD's are of complex construction, and consequently relatively expensive to make, which again mitigates against the full and proper use of such devices. For example, Brown in U.S. Pat. No. 5,702,279 discloses a two part PFD which is adapted to be worn uninflated around the waist, comprising and inflatable flotation device and a waist belt. When the PFD is inflated, the inflated part separates from the waist part, and is attached thereto by at least one tether. Most of the known PFD's use a single gas cartridge to inflate the PFD, thus exposing the user to risk if the cartridge has leaked, and does not contain sufficient gas.

In order to at least mitigate any difficulties that arise when insufficient gas is available from the cartridge, the known PFD's are often provided with a subsidiary inflation device constructed to be operated orally by the wearer. An oral inflation device can also be used to ensure that the PFD maintains an adequate internal gas pressure over an extended time period after it has been inflated. While these oral inflation devices are effective, they are also subject to one major disadvantage, which is a consequence of the fact that in the deflated condition, prior to use, the PFD is folded up relatively tightly to fit into a cover, for example as shown by Brown in U.S. Pat. No. 5,702,279. Due to this, the access of air into the PFD from an oral inflation device can be either substantially blocked, or even sealed, by the gas inlet nozzle being pressed against the flexible material from which the PFD is made. Any condensation present inside the PFD will have the same effect, and severely hinder inflation.

The fact that the uninflated PFD is folded up relatively tightly can also cause problems even when the gas cartridge is fully charged. The inflatable bladder that provides the required flotation is generally constructed from an elastomer impregnated fabric, such as rubberised nylon. The gas used in the cartridge is generally carbon dioxide. As the carbon dioxide is vented from the cartridge into the PFD expansive cooling occurs, which, as noted by De Boer in U.S. Pat. No. 3,142,850, can result in the formation of both liquid carbon dioxide, and carbon dioxide "snow", thus creating localised temperatures below about −40° C. At this temperature the bladder fabric freezes, loses its flexibility, and cannot be easily separated from the gas inlet nozzle constructions often used. De Boer, in U.S. Pat. No. 3,142,850, recognises this difficulty and describes a gas inlet nozzle which includes a "cold dissipator" adapted to trap carbon dioxide snow. The gas inlet nozzle described by De Boer is intended for inflatable boats and the like, and is relatively large and bulky, thus making it impractical for a personal PFD.

This sealing problem is also exacerbated in many designs, such as Mackal et al, U.S. Pat. No. 3,754,731 and Lind et al, U.S. Pat. No. 5,188,142, by locating the inlet gas nozzle in what is effectively a recess, such as the surrounding upstanding strengthening rim as shown by Mackal et al, or recessed within the end of a threaded fitting, as shown by Lind et al.

SUMMARY OF THE INVENTION

The present invention seeks to provide a PFD which overcomes these difficulties. The present invention seeks to provide an inflatable PFD which is comfortable to wear, which is readily inflated by a gas cartridge, which includes an oral inflation device, and includes at least one gas inlet nozzle that minimises any risk of gas inlet nozzle blockage by the bladder fabric material of the PFD. It is preferred that the same gas inlet nozzle is used for both inflation devices, that is to say the gas cartridge and the oral inflation device. The gas inlet nozzle design includes a plurality of peripheral openings which have a gas flow axis more or less perpendicular to that of the gas pipe to which the nozzle is attached, and is mounted into the bladder material without a surrounding rim. It is preferred that the gas nozzle protrude somewhat into the bladder space from the bladder fabric through which it is mounted. The gas inlet nozzle may also include a central gas opening in line with the axis of the nozzle. By this means, even when the PFD is tightly folded up in the fully deflated state, it is extremely unlikely that all of the gas openings in the gas inlet nozzle can be obstructed, so that the PFD can always be inflated.

Thus in a first embodiment this invention seeks to provide an inflatable personal flotation device comprising in combination:

a first strap means having opposed ends joined together by a first buckle means;

a second strap means having opposed ends joined together by a second buckle means;

a plurality of spaced apart anchor strap means joining the first strap means to the second strap means;

an inflatable bladder attached to the second strap means;

a compressed gas inflation means activated by a release handle attached to a first gas pipe communicating with the interior of the inflatable gas bladder;

a first gas inlet nozzle means attached to the first gas pipe inside the bladder and in sealing engagement with the inside of the gas bladder;

a manual inflation means attached to a second gas pipe communicating with the inside of the bladder;

a second gas inlet nozzle means attached to the second gas pipe inside the bladder and in sealing engagement with the inside of the gas bladder; and a detachable cover including a releasable closure means constructed and arranged to contain the first strap means, the second strap means, the anchor strap means and the bladder in an uninflated state, and which leaves exposed the first buckle means, the second buckle means, and the release handle;

wherein at least one of the first and second gas inlet nozzle means includes gas vent holes constructed and arranged to permit gas flow into the uninflated bladder in a direction substantially perpendicular to the gas pipe, and the at least one nozzle means is not contained within a recess.

Preferably, both of the first and second gas inlet nozzle means include gas vent holes constructed and arranged to permit gas flow into the uninflated bladder a direction substantially perpendicular to the gas pipe. More preferably, the first and second gas inlet nozzle means are the same.

Conveniently, at least one of the first and second gas inlet nozzle means further includes gas vent holes constructed and arranged to permit gas flow in a direction substantially in line with the gas pipe.

Preferably, the anchor straps are of sufficient length for the inflated bladder to be positioned under a user's armpits when the first strap is located about the user's waist.

BRIEF DESCRIPTION OF THE DRAWINGS

In the attached drawings showing one embodiment of the invention.

DESCRIPTION OF THE PREFERRED EMBODIMENTS

Figure 1:
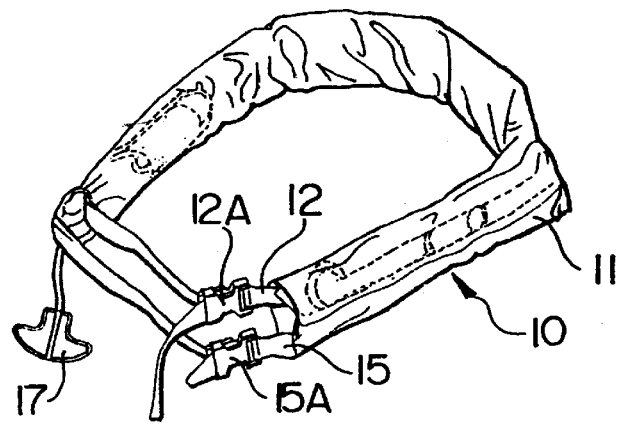
FIG. 1 shows a perspective view of the PFD in an uninflated condition.
Figure 2:
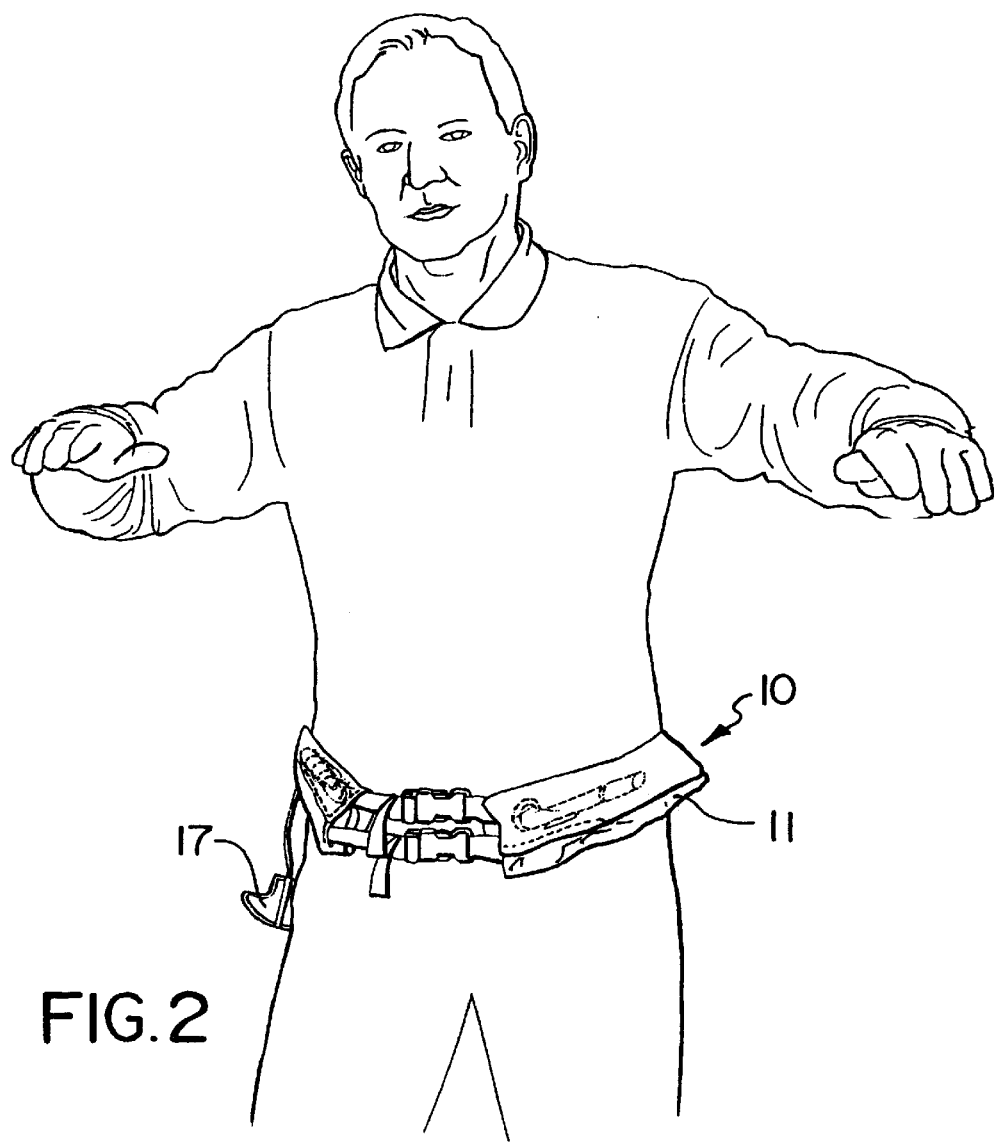
FIG. 2 shows schematically the PFD of FIG. 1 around the waist of a user.
Figure 3:
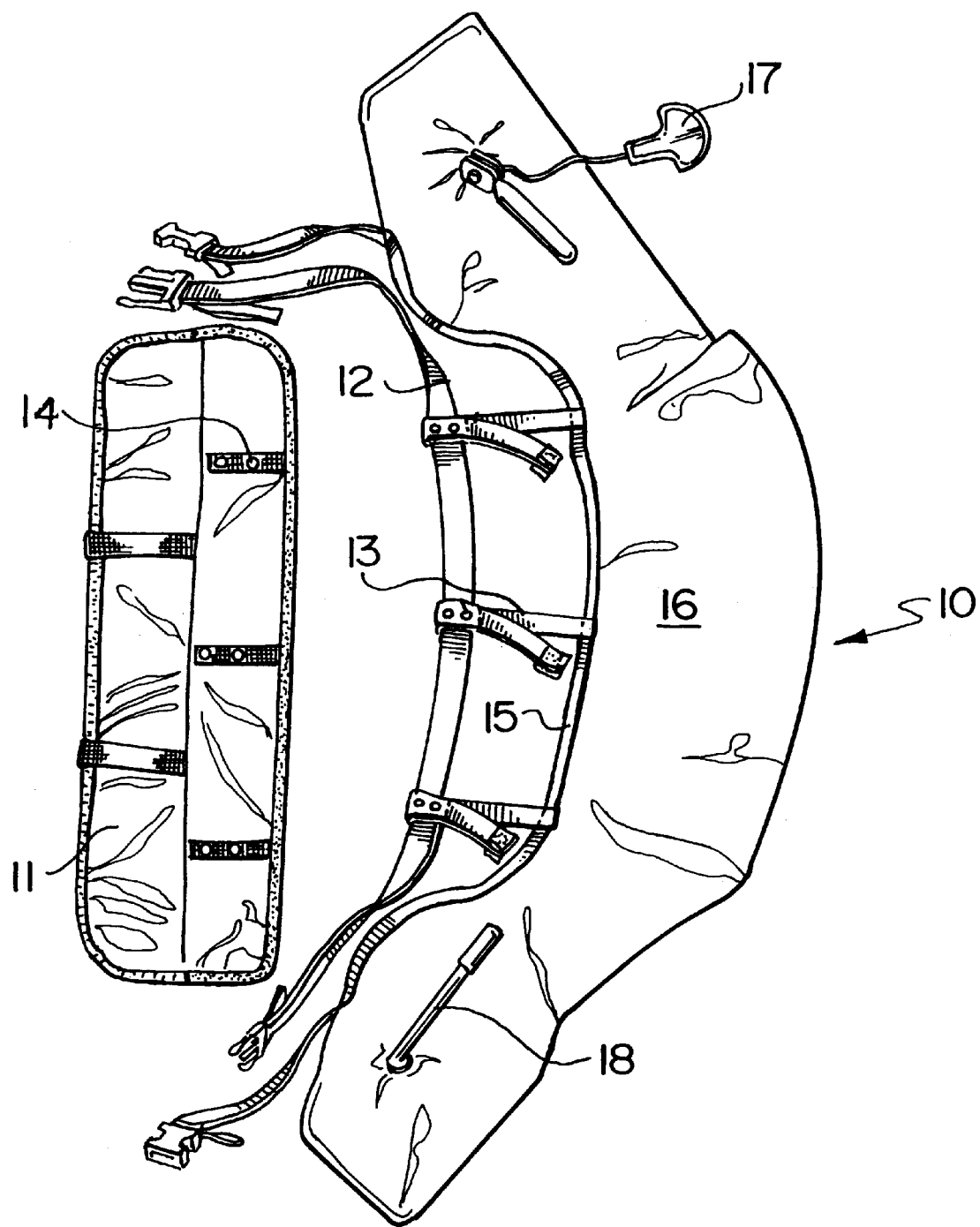
FIG. 3 shows a plan view of the PFD of FIG. 1 removed from its cover.

Referring first to FIGS. 1, 2, 3 and 4 the PFD 10 has an outer cover 11 which contains the inflatable parts of the PFD whilst being worn in the uninflated condition. A first belt 12 passes through the cover 11, and is attached to the inflatable bladder by the anchor straps 22. The cover 11 is detachably attached to the belt 12 by the snaps 13; other attachment means are well known in the art. A second belt 15 is directly attached to the bladder 16. Both of these belts are provided with adjustable buckle devices 12A and 15A, so that the PFD may be secured around the waist of a user, as shown in FIG. 2. The buckle used is of the two part, snap-fit type; one half is securely attached to one end of each strap, and the other half is slidably engaged onto the other end, thus facilitating size adjustment by the user.

Further, as a safety precaution, it is desirable that the two straps 12, 15 and their buckles 12A, 15A are not the same size, so that one part of the buckle 12A cannot be engaged into the buckle 15A. It is also desirable that they are of different colours, belt 12 and buckle 12A typically being black, and belt 15 and buckle 15A typically being black. It is also usual to fabricate the bladder 16 from material of a highly visible colour, such as bright yellow.

Figure 4:
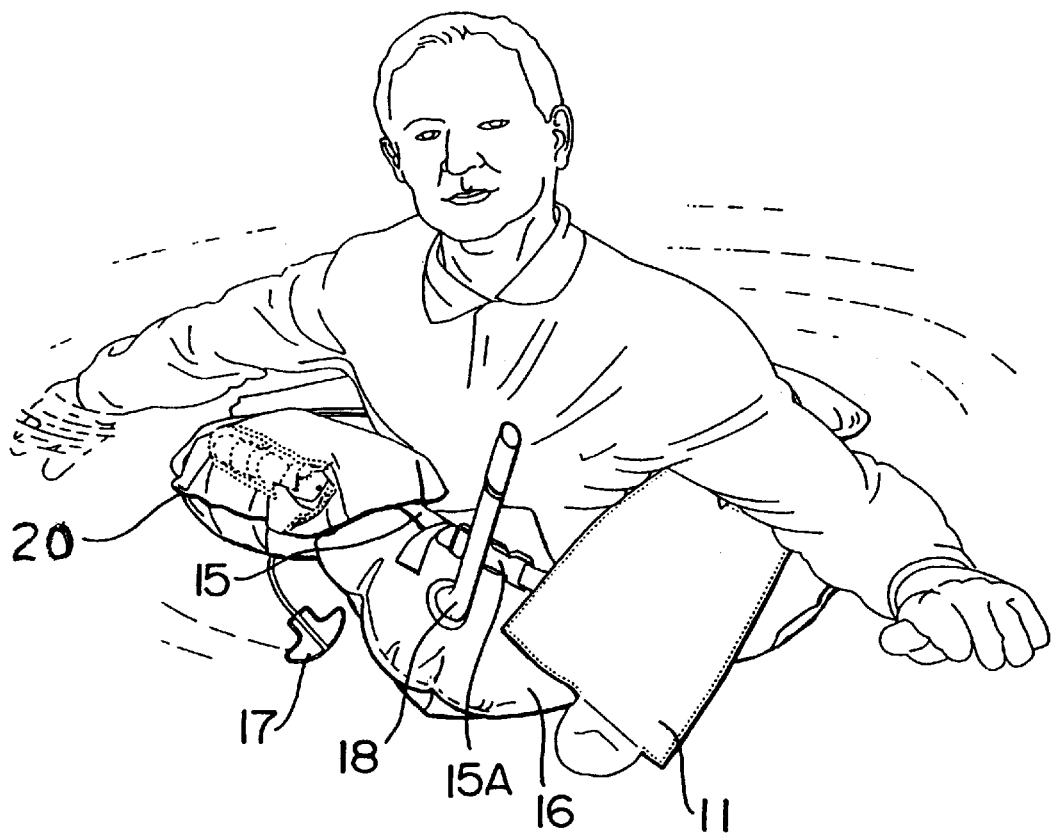
FIG. 4 shows schematically the PFD of FIG. 2 after inflation with the cover attached.

When the PFD is in the uninflated condition and stowed within the cover 11, a release handle 17 protrudes from one end of the cover 11, usually to the user's right. Inside the other end of the cover 11 is a manual inflation device 18, which becomes readily accessible—as shown in FIG. 4—when the PFD is inflated. The operation of the release handle 17 and of the manual inflation device 18 is described below.

In FIG. 4 the PFD is shown inflated. The cover 11 has been opened, but not removed from the snaps 13 (this happens when the release cord 17 is used) to release the inflated bladder 16. To facilitate release of the bladder 16, the edges of the cover 11 are held together with a readily openable closure, such as cooperating strips of hook and loop fabric. Using the release cord 17 also operates the gas inflation device, as is described more fully below. The first belt 12, which is not visible in FIG. 4 is still securely fastened about the user's waist, and the two ends of the inflated bladder 16 are still attached together by the second belt 15, which, as noted above, is securely attached to the bladder 16. The buckle 15A can be adjusted for comfort. The manual inflation device 18 is now exposed and accessible. The gas cartridge device (which is discussed in more detail below) is located at the other end of the inflated bladder, in the pocket 20.

Figure 5:
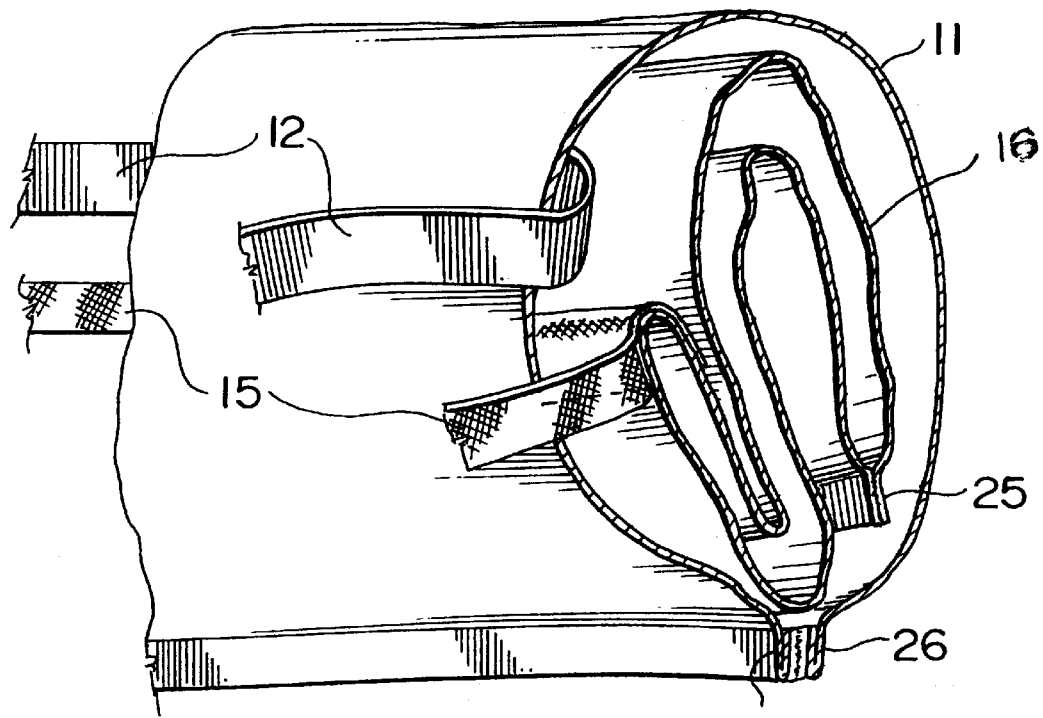
FIG. 5 shows schematically partly sectioned an uninflated PFD.

FIG. 5 shows schematically and partly sectioned an uninflated PFD, as in FIG. 1, in which the bladder 16 is folded up within the attached cover 11. It should be understood that in practise the bladder 16 is relatively tightly folded so as to minimise the space required within the cover 11. In this condition, the folded sheets of the elastomer coated fabric used to make the bladder are more or less forced together into contact. The bladder is sealed into a more or less tubular shape at its edges as at 25 by any suitable method, such as stitching or welding. When folded up, the end margins 26, 27 of the cover 11 are attached to each other by a suitable closure means to retain the bladder 16. The closure means used should also be readily openable to enable the bladder 16 to inflate without hindrance; two cooperating strips, or portions of strips, of hook and loop material may be used for this purpose. The first belt 12 passes through the cover 11 between it and the bladder 16. The second belt 15 is attached to the bladder 16 by any suitable means, such as stitching; suitable construction methods for PFD bladders are well known.

Figure 6:
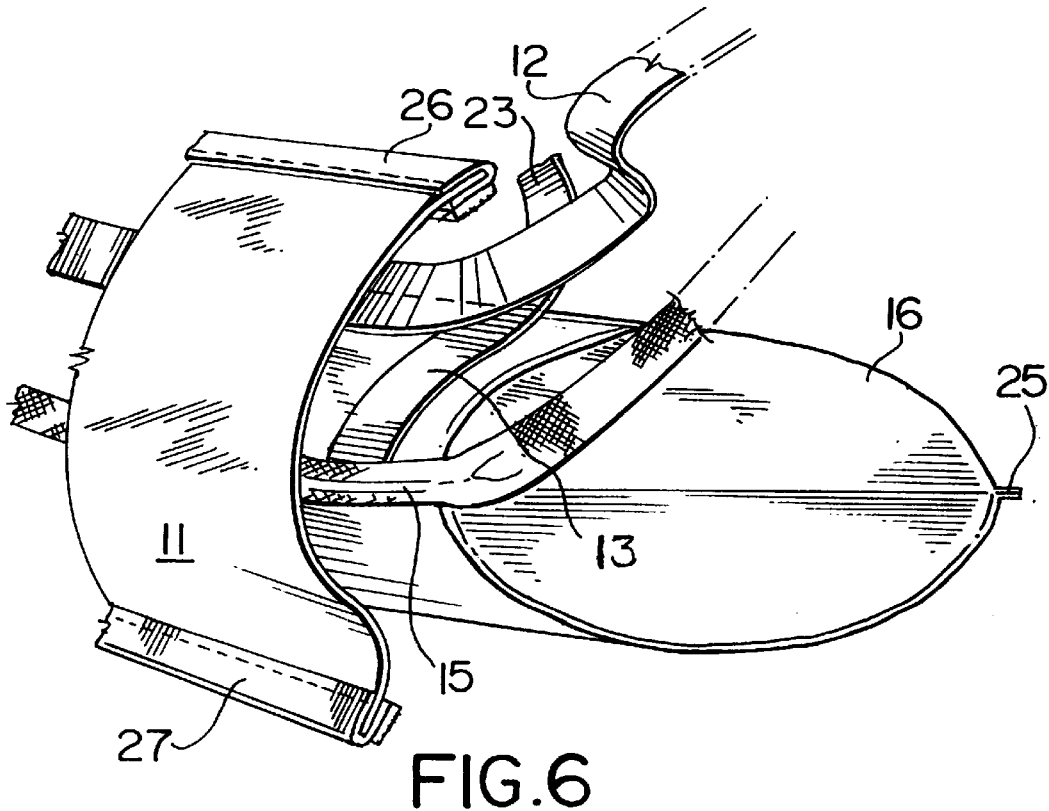
FIG. 6 shows schematically a partly sectioned the PFD of FIG. 5 inflated.

FIG. 6 shows schematically partly sectioned the bladder 16 after inflation. The seal 25 is now more or less diametrically separated from the line of the second strap 15, and the cover margins 26, 27 are separated thus permitting inflation of the bladder 16. It can also be seen that the first strap 12 is attached to the second strap 15 by short anchor straps 13. These anchor straps allow the inflated bladder 16 to be positioned at a suitable point on the user's body, for example under the armpits as shown in FIG. 4 while still firmly attached to the user's waist or thereabouts by the first strap 12. Packing straps, formed suitable as extensions of the anchor straps, as at 22 (see also FIG. 3) are used to aid in holding the folded bladder 16 into the cover 11. To secure the extensions 23 in place around the folded bladder 16 they are provided with hook and loop fabric on their ends (not shown), which conveniently is engaged between the similar materials on the edges 26, 27 of the cover 11.

Figure 7:
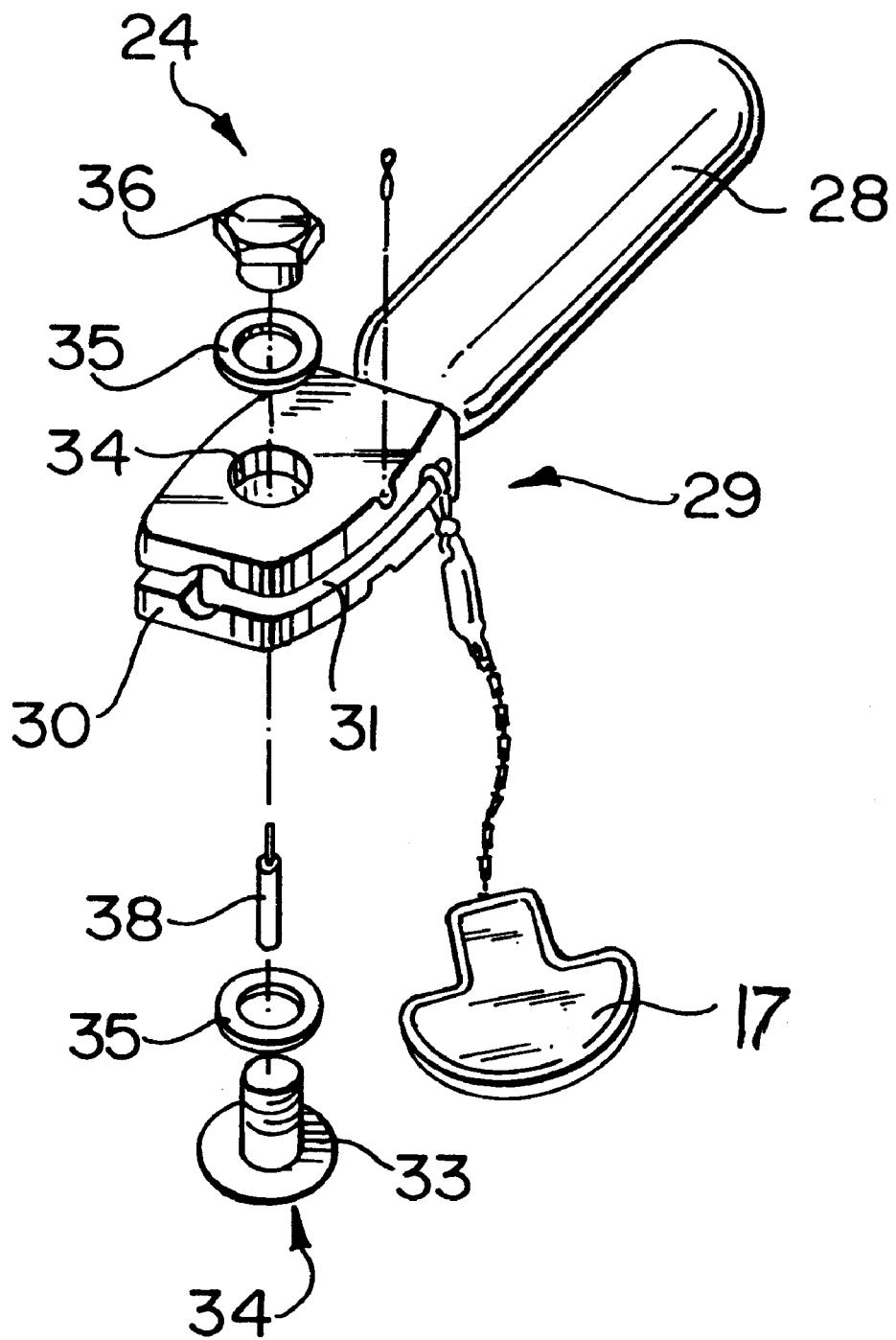
FIG. 7 shows in partly exploded format a gas cartridge inflation device.
Figure 8:
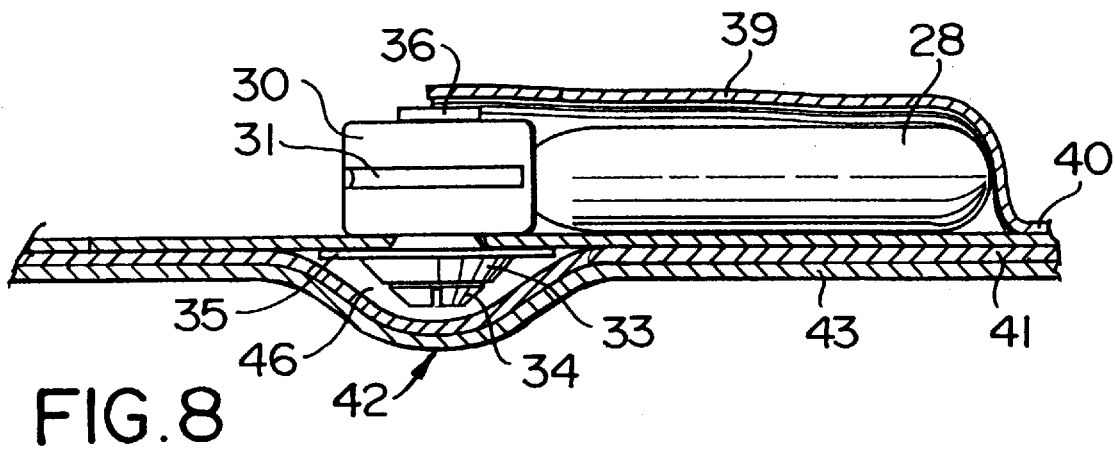
FIG. 8 shows the gas cartridge device of FIG. 7 attached to the PFD of FIGS. 1 or 5 in an uninflated state.

FIG. 7 shows schematically in partly exploded form a typical gas cartridge assembly for use with the PFD. The gas cartridge 28 is attached to a valve block 29, which is in its turn secured to the bladder 16, as shown in FIG. 8. The valve block 29 includes a body 30 which carries a release lever 31 to which is attached the release handle 17. When the user pulls on the release handle 17, the end of the release lever within the body 30 breaks the seal(not shown) of the gas cartridge 28, thus initiating inflation. To avoid unintended inflation, a safety pin 58 can be provided to lock the release lever 31.

The body 30 is attached to the bladder 16 by means of the gas pipe 33, which carries the gas inlet nozzle 34 at its end, and which is provided with a sealing washer 35. The pipe 33 enters a suitably sized bore 34 in the body 30, and is secured to it by engagement with the threaded cap 36. The gas pipe 33 and the nozzle 34 are preferably a single piece plastic moulding, fabricated in a material which can be welded by conventional techniques to the elastomer impregnated fabric used for the bladder 16.

The gas pipe 33 also includes suitable holes (not shown) to allow gas to flow from the cartridge 28 to the bladder 16. A sealing washer 37 is also provided between the cap 36 and the body 30. Within the gas pipe 33 a one-way valve 38 is provided to allow gas under pressure to enter the bladder 18 and then be retained therein.

In FIG. 8 further details of the gas cartridge arrangement are shown. The gas cartridge 28 is suitably held within a pocket 20 provided on the outside surface of the bladder 16. FIG. 8 also shows more accurately than FIG. 5 the consequences of folding the bladder 16 into the cover 11. Three adjacent parts of the bladder fabric, 40, 41 and 42 are located quite close together, and at the region 42 the layer 41 in particular, under the compression exerted by the additional layer or layers 42, is effectively touching the end faces of the nozzle 34. It is therefore relatively easy for cold carbon dioxide gas having a temperature as low as −40° C. released from the gas cartridge to impact the bladder fabric pressed closely around the nozzle thus changing a relatively flexible fabric into a cold and stiff one, thus severely hampering gas release into the bladder 16.

Figure 9:
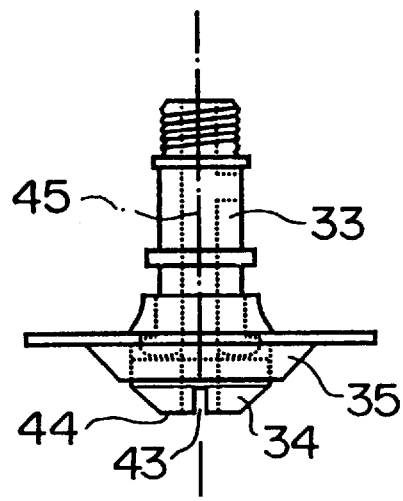
FIG. 9 shows the detail of the gas nozzle to which the gas cartridge of FIG. 8 is attached.
Figure 10:
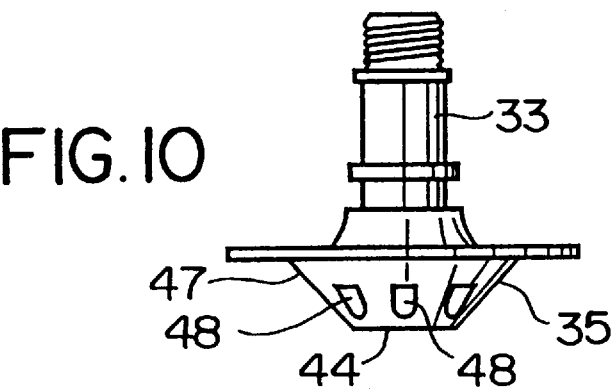
FIGS. 10, 11, 12, 13 and 14 show alternative nozzle designs.
Figure 11:
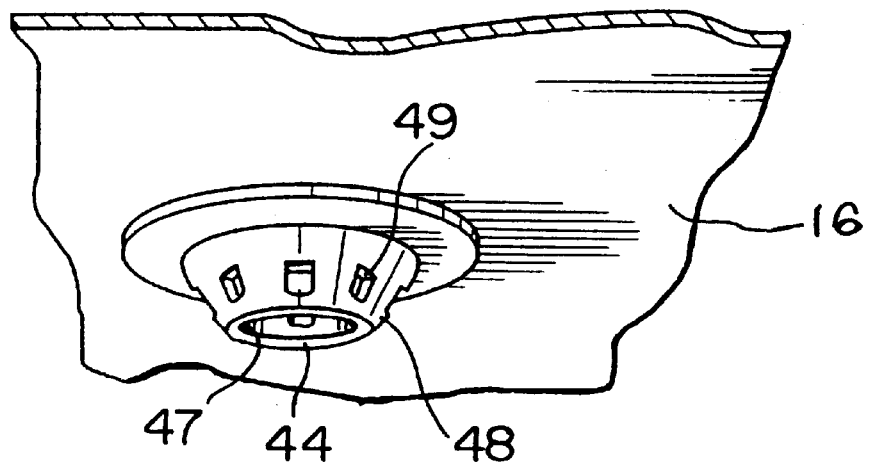

The gas inlet nozzle shown in FIGS. 7 and 8 is shown in more detail in FIG. 9. The relevant feature of this nozzle is the relatively deep and wide slot 43 which extends across the face 44 of the nozzle. Although this slot permits gas flow in line with the axis 45 of the gas pipe 33, it also allows significant gas flow laterally away from this axis, substantially perpendicularly to it, especially into the free space 46 around the nozzle (see FIG. 8). Consequently, even though the exiting carbon dioxide is quite cold, it can always access the free space 46, and initiate bladder inflation. As soon as the bladder inflates even only a small amount around the gas inlet nozzle, the free space 46 radically increases, thus permitting inflation of the whole of the bladder.

Figure 12:
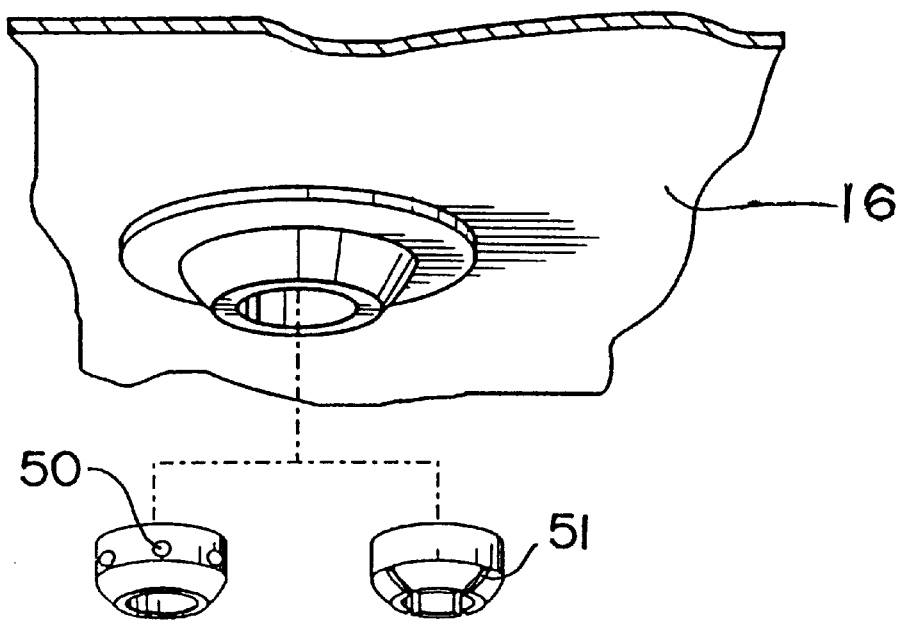

In FIGS. 10–14 a number of different gas inlet nozzles are shown. In FIGS. 11–14 the nozzle is shown as mounted through the bladder 16. Taking FIGS. 10 and 11 first, the nozzle shown has a frusto-conical shape. The flat crown face of the nozzle 44 may include a central gas aperture 47 (FIG. 10) if desired. The conical face 48 includes a plurality of substantially square gas vent holes 49, which will allow gas flow into the free space around the nozzle. As shown in FIG. 12, the substantially square holes 49 can be replaced by circular holes 50, or by rectangular slots 51. FIG. 12 also shows that the gas pipe 33 does not have to be made integrally with the nozzles 50, 51. In the construction shown, the nozzles 50, 51 are a snap fit into the end of the gas pipe 33.

Figure 13:
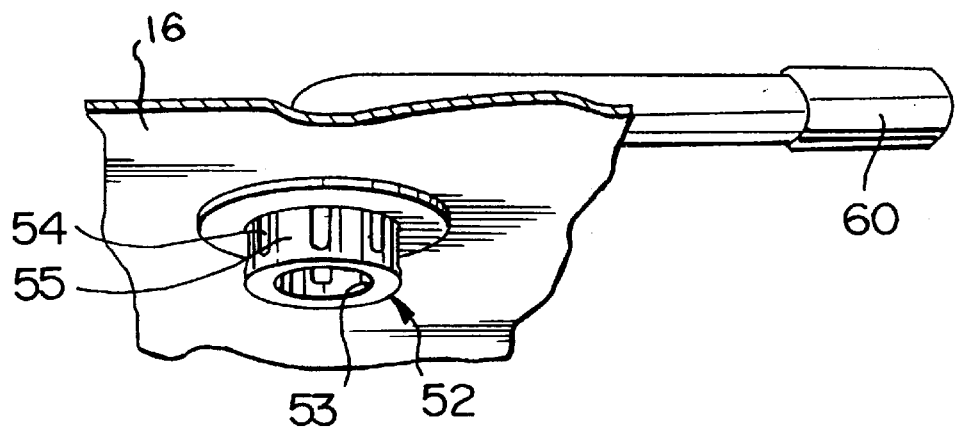

In FIG. 13 the nozzle body is substantially cylindrical, and includes a central gas vent hole 53 which is circular, together with a plurality of slots 54 in the cylinder wall 55.

Figure 14:
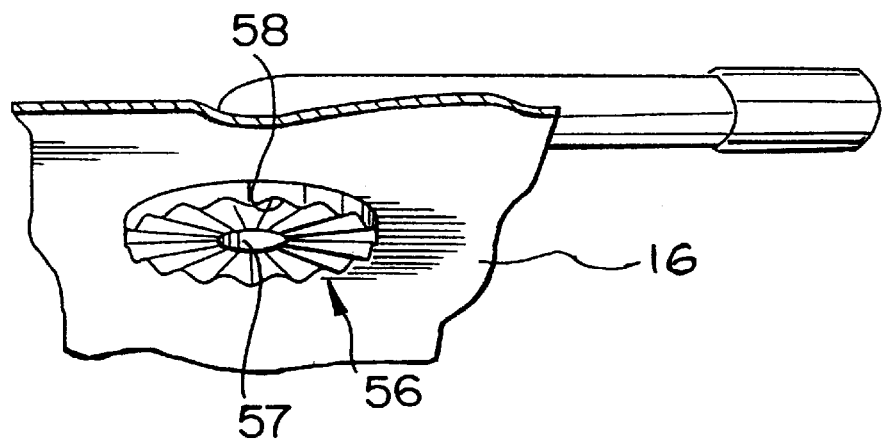

In FIG. 14 the nozzle 56 is also cylindrical, but is comparatively short. The end face of the cylinder has a central gas vent 57, and the face of the cylinder is formed with a plurality of substantially flutes 58, thus again allowing for gas to escape into the free space.

Figure 15:
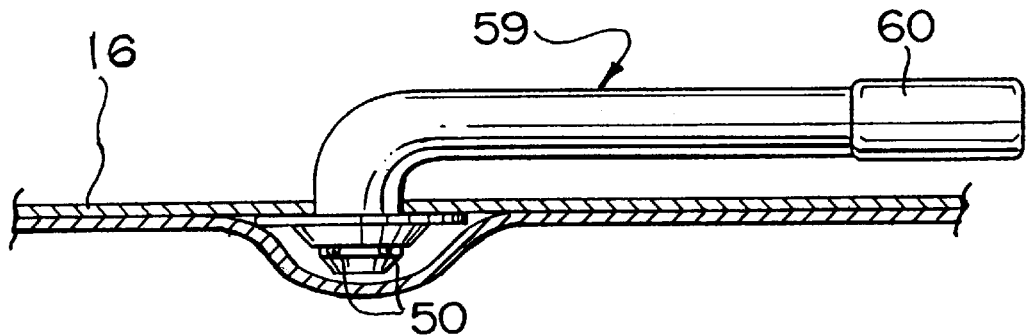
FIG. 15 shows an oral inflation device attached to the PFD of FIGS. 1 or 5.

In FIG. 15 one of the nozzles of FIG. 12 having a plurality of holes 50 is shown attached to an oral inflation device 18, closed by a cap 60. In use, the cap 60 is removed to provide access to a mouthpiece, which includes a one way valve to prevent unintended deflation of the PFD. devices of this type are well known in the art.

What is claimed is:

1. An inflatable personal flotation device comprising in combination:

a first strap means having opposed ends joined together by a first buckle means;

a second strap means having opposed ends joined together by a second buckle means;

a plurality of spaced apart anchor strap means joining the first strap means to the second strap means;

an inflatable gas bladder attached to the second strap means;

a compressed gas inflation means activated by a release handle attached to a first gas pipe communicating with the interior of the inflatable gas bladder;

a first gas inlet nozzle means attached to the first gas pipe inside the bladder and in sealing engagement with the inside of the gas bladder;

a manual inflation means attached to a second gas pipe communicating with the inside of the bladder;

a second gas inlet nozzle means attached to the second gas pipe inside the bladder and in sealing engagement with the inside of the gas bladder; and a detachable cover including a releasable closure means constructed and arranged to contain the first strap means, the second strap means, the anchor strap means and the bladder in an uninflated state, and which leaves exposed the first buckle means, the second buckle means, and the release handle;

wherein at least one of the first and second gas inlet nozzle means includes gas vent holes constructed and arranged to permit gas flow into the uninflated bladder in a direction substantially perpendicular to the gas pipe, and the at least one nozzle means is not contained within a recess.

2. A personal flotation device according to claim 1 wherein both of the first and second gas inlet nozzle means include gas vent holes constructed and arranged to permit gas flow into the uninflated bladder a direction substantially perpendicular to the gas pipe.

3. A personal flotation device according to claim 1 wherein at least one of the first and second gas inlet nozzle means further includes gas vent holes constructed and arranged to permit gas flow in a direction substantially in line with the gas pipe.

4. A personal flotation device according to claim 2 wherein both of the first and second gas inlet nozzle means further includes gas vent holes constructed and arranged to permit gas flow in a direction substantially in line with the gas pipe.

5. A personal flotation device according to claim 1 wherein the detachable cover releasable closure means comprises cooperating parts of a hook and loop closure means.

6. A personal flotation device according to claim 1 further including releasable packing straps containing the bladder within the cover in a folded uninflated condition.

7. A personal flotation device according to claim 1 wherein the at least one gas inlet nozzle is of a cylindrical shape, having an end face and a cylinder wall, and includes a plurality of substantially radial gas vent holes through the cylinder wall.

8. A personal flotation device according to claim 2 wherein at least one of the gas inlet nozzles is of a cylindrical shape, having an end face and a cylinder wall, and includes a plurality of substantially radial gas vent holes through the cylinder wall.

9. A personal flotation device according to claim 6 wherein the at least one gas inlet nozzle further includes a gas vent hole in the end face of the cylinder.

10. A personal flotation device according to claim 7 wherein the at least one gas inlet nozzle further includes a gas vent hole in the end face of the cylinder.

11. A personal flotation device according to claim 1 wherein the at least one gas inlet nozzle is of a frusto-conical shape, having an end face and an inclined conical wall, and includes a gas vent hole comprising a diametrically located slot extending across the end face and into the conical wall.

12. A personal flotation device according to claim 2 wherein at least one of the gas inlet nozzles is of a frusto-conical shape, having an end face and an inclined conical wall, and includes a gas vent hole comprising a diametrically located slot extending across the end face and into the conical wall.

13. A personal flotation device according to claim 1 wherein the at least one gas inlet nozzle is of a frusto-conical shape, having an end face and an inclined conical wall, and includes a plurality of gas vent holes in the conical wall, the gas vent holes having a shape chosen from the group consisting of round, square, and a rectangular slot.

14. A personal flotation device according to claim 2 wherein at least one of the gas inlet nozzles is of a frusto-conical shape, having an end face and an inclined conical wall, and includes a plurality of gas vent holes in the conical wall, the gas vent holes having a shape chosen from the group consisting of round, square, and a rectangular slot.

15. A personal flotation device according to claim 12 wherein the at least one gas inlet nozzle further includes a gas vent hole in the end face of the cylinder.

16. A personal flotation device according to claim 13 wherein the at least one gas inlet nozzle further includes a gas vent hole in the end face of the cylinder.

17. A personal flotation device according to claim 1 wherein the at least one gas inlet nozzle comprises a cylinder, with and end face and a central gas vent hole, and the end face includes a plurality substantially radial flutes.

18. A personal flotation device according to claim 2 wherein at least one of the gas inlet nozzles comprises a cylinder, with and end face and a central gas vent hole, and the end face includes a plurality substantially radial flutes.

19. A personal flotation device according to claim 1 wherein the anchor straps are of sufficient length for the inflated bladder to be positioned under a user's armpits when the first strap is located about the user's waist.

* * * * *